(12) United States Patent
Jimenez Pino et al.

(10) Patent No.: US 8,193,746 B2
(45) Date of Patent: Jun. 5, 2012

(54) AUTOMOTIVE ELECTRIC MOTOR SPEED CONTROL SYSTEM

(75) Inventors: Rafael Jimenez Pino, Valls (ES); Juan Luis Castilla, Puigpelat (ES)

(73) Assignee: Lear Corporation, Southfiled, MI (US)

( * ) Notice: Subject to any disclaimer, the term of this patent is extended or adjusted under 35 U.S.C. 154(b) by 535 days.

(21) Appl. No.: 12/411,480

(22) Filed: Mar. 26, 2009

(65) Prior Publication Data

US 2009/0289486 A1 Nov. 26, 2009

Related U.S. Application Data

(60) Provisional application No. 61/055,623, filed on May 23, 2008.

(51) Int. Cl.
H02P 1/00 (2006.01)
H02P 3/00 (2006.01)

(52) U.S. Cl. ......... 318/270; 318/268; 318/293; 318/430

(58) Field of Classification Search .............. 318/9, 268, 318/270, 293, 565, 430; 323/288; 361/18
See application file for complete search history.

(56) References Cited

U.S. PATENT DOCUMENTS

| | | | |
|---|---|---|---|
| 5,514,977 A | 5/1996 | Agiman | |
| 5,552,683 A | 9/1996 | Dargent | |
| 5,798,624 A | 8/1998 | Wilke et al. | |
| 5,818,178 A | 10/1998 | Marumoto et al. | |
| 5,977,732 A | 11/1999 | Matsumoto | |
| 6,078,154 A | 6/2000 | Manlove et al. | |
| 6,335,600 B1 | 1/2002 | Kasai et al. | |
| 6,380,757 B1 | 4/2002 | Draves et al. | |
| 6,437,533 B1 | 8/2002 | Du et al. | |
| 6,545,439 B2 | 4/2003 | Kaeufl et al. | |
| 6,617,816 B2 | 9/2003 | Ohno et al. | |
| 6,949,904 B2 * | 9/2005 | Rumney | 318/565 |
| 7,064,506 B2 * | 6/2006 | Stewart et al. | 318/293 |
| 7,064,509 B1 | 6/2006 | Fu et al. | |
| 7,342,369 B2 | 3/2008 | Pino et al. | |
| 7,723,970 B1 * | 5/2010 | Fernald | 323/282 |
| 2003/0080699 A1 * | 5/2003 | Rumney | 318/9 |
| 2004/0098213 A1 | 5/2004 | Gerlach | |
| 2004/0107071 A1 | 6/2004 | Gerlach | |
| 2004/0111233 A1 | 6/2004 | Gerlach | |
| 2005/0285551 A1 * | 12/2005 | Stewart et al. | 318/268 |

(Continued)

FOREIGN PATENT DOCUMENTS

DE 19634049 C2 3/1998

(Continued)

OTHER PUBLICATIONS

Office Action dated Jan. 11, 2010 from corresponding German Application No. 10 2009 020 842.9.

*Primary Examiner* — Paul Ip

(74) *Attorney, Agent, or Firm* — Brooks Kushman P.C.

(57) ABSTRACT

An automotive electric motor speed control system may include at least one electric motor adapted to cause a moveable element to move, a DC/DC power converter configured to output a voltage to the at least one electric motor that increases to a desired value and subsequently decreases to control the movement of the moveable element, and a controller configured to control the rate of voltage increase and voltage decrease output by the converter.

18 Claims, 3 Drawing Sheets

U.S. PATENT DOCUMENTS

| | | |
|---|---|---|
| 2006/0111144 A1 | 5/2006 | Nakajima |
| 2006/0139179 A1* | 6/2006 | Yamada et al. ............... 340/644 |
| 2009/0289486 A1 | 11/2009 | Jimenez Pino et al. |
| 2010/0027169 A1* | 2/2010 | Knott et al. ..................... 361/18 |
| 2010/0213914 A1* | 8/2010 | Fernald ......................... 323/288 |

FOREIGN PATENT DOCUMENTS

| | | |
|---|---|---|
| DE | 102004033129 A1 | 3/2005 |
| DE | 69733141 T2 | 1/2006 |
| DE | 102005015658 A1 | 1/2007 |
| EP | 0997341 B1 | 10/1999 |
| EP | 0997341 A1 | 5/2000 |
| EP | 1453172 A1 | 9/2004 |
| GB | 2060944 A | 5/1981 |
| WO | 2006111144 A1 | 10/2006 |

\* cited by examiner

AUTOMOTIVE ELECTRIC MOTOR SPEED CONTROL SYSTEM

CROSS-REFERENCE TO RELATED APPLICATIONS

This application claims the benefit of U.S. Provisional Application No. 61/055,623, filed May 23, 2008, of which FIGS. 1a, 1b and 4, as well as page 1, line 4 though page 2, line 14, and page 9, lines 11 through 15 are herein incorporated by reference.

BACKGROUND

European Patent Application Publication Number 0 997 341 A1 provides a control device for a movable member. The control device includes a DC motor for establishing a transfer of the movable member in such a manner that after a first position of the moveable member is stored in a memory, even if the movable member is at a second position, the moving member is returned to the first position upon manipulating a switch. The control device also includes a motor pulse generating circuit for generating a cut-off frequency which is variable depending on a ripple pulse frequency which is indicative of a rotational number of the motor.

United Kingdom Patent Application Publication Number 2 060 944 A provides a seat position control device for a powered seat-adjusting mechanism for motor vehicles. The motor drives for the various adjustments each use of a motor with a predetermined number of poles. Thus, for each revolution of a motor, a predetermined number of pulses is generated. By counting these pulses and comparing them with a reference, the position of the seat can be determined. Within a memory, a desired location setting may be registered so that the seat can be returned to that setting when desired. A microprocessor is used as the logic and memory medium.

SUMMARY

An automotive seat system may include a moveable vehicle seat, at least one electric motor adapted to cause the seat to move, and a DC/DC power converter. The system may also include at least one switch electrically connected with the at least one motor and the converter, and a controller in communication with the converter. The converter may be configured to output a voltage ramp, under the command of the controller, to the at least one motor to control the acceleration or deceleration of the seat.

An automotive seat system may include a moveable vehicle seat, at least one electric motor adapted to cause the seat to move, and a DC/DC power converter configured to output a voltage to the at least one electric motor that increases to a desired value and subsequently decreases to control the movement of the seat. The system may also include a controller configured to control the rate of voltage increase and voltage decrease output by the converter.

An automotive electric motor speed control system may include at least one electric motor adapted to cause a moveable element to move, a DC/DC power converter configured to output a voltage to the at least one electric motor that increases to a desired value and subsequently decreases to control the movement of the moveable element, and a controller configured to control the rate of voltage increase and voltage decrease output by the converter.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
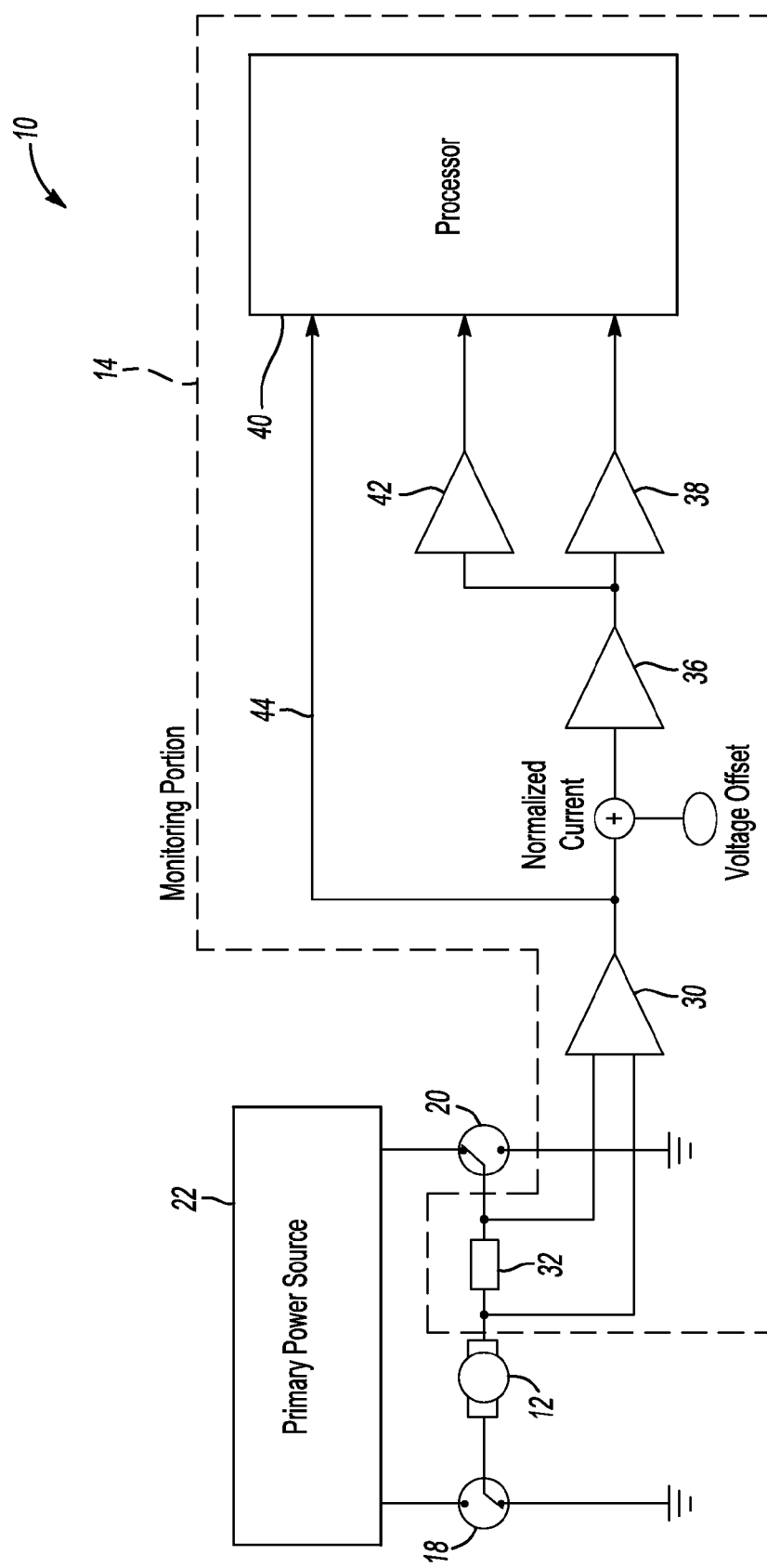
FIG. 1 is a block diagram on an embodiment of an electric motor monitoring system.

Referring now to FIG. 1, an embodiment of a monitoring system 10 for an electric motor 12 may include a current monitoring portion 14. The monitoring portion 14 may be configured to determine the speed, movement, angular position and/or other parameters associated with the operation of the motor 12 as, for example, a function of the current circulating therethrough. The system 10 may be used in any number of environments where motors facilitate movement of moveable objects. For example, the motor 12 may be configured to facilitate movement of a vehicle seat within a vehicle seat track and/or a window within a window track.

As known in the art, vehicle occupants may control electrically positionable seats by controlling a seat positioning switch that communicates with a control module used to instruct and control operations of an electric motor. A common vehicle seat control function relates to controlling fore and aft positioning of the vehicle seat. The switch may be moveable in a fore direction to instigate forward movement of the vehicle seat, and in an aft direction to instigate rearward movement of the vehicle seat. The vehicle seat track may include stops or other stroke limiting elements to prevent the fore and after movements beyond desired bounds of the seat track.

The system 10 of FIG. 1 may include first and second relays 18, 20 to control current from a primary power source 22. In the fore direction, the first relay 18 is connected to ground and the second relay 20 is connected to the primary power source 22. In the aft direction, the second relay 20 is connected to ground and the first relay 18 is connected to the primary power source 22. When the switch is not actuated, i.e., when no movement is desired, both of the relays 18, 20 are connected to ground. This controls the direction of current flow through the motor 12 and the corresponding movement of the vehicle seat. Other suitable control methodologies, however, may also be used.

The inertia generated during seat movement may be sufficient to permit continued movement of the seat after the relays 18, 20 are opened, and power to the motor 12 ceases. As apparent to those of ordinary skill, the motor 12 may continue to rotate as the seat continues to so move. Thus, the motor 12 may continue to generate current ripples after power to the motor 12 ceases.

As discussed above, stops or other elements may be included to impede and/or prevent further movement of the seat, window, etc. These elements provide an obstruction of suitable strength such that the force imparted to the stop may cause the seat, window, etc. to rebound in the opposite direction. This rebounding may cause the circulating current to experience ripples associated with the direction of rebound.

The current ripples may thus include a different sign from the ripples prior to the rebound due to the motor 12 rotating and current flowing in an opposite direction after the rebound.

The ability to continue counting current ripples and other current related parameters after power cut-off and motor rebound may be helpful in properly monitoring operation of the vehicle seat, window, or other element associated with the motor 12. While such movement may correspond with relatively small angular rotations of the motor 12, over time, each successive rotation, if not monitored and reported as described herein, may build on prior non-reported rotations such that it may become difficult to accurately determine the true positioning of the seat, window, etc.

The monitoring element 14 may include a bidirectional current sensor 30 to monitor and otherwise assess current under any number of motor operating conditions, including but not limited to those described above. The bi-directional current sensor 30 may be connected to both sides of a shunt resistor 32, or other element having properties sufficient to facilitate monitoring current circulating through the motor 12. Connecting the bidirectional current sensor 30 in this manner, i.e., on both sides of the current regulator 32, allows the current sensor 30 to sense circulating current in primary and secondary directions.

For example purposes, current flowing to the motor 12 from the primary power source 22 (and through either one of the relays 18, 20) is considered to be current associated with the primary direction. Current resulting from continued rotation of the motor after the relays 18, 20 are closed is considered to be current associated with the secondary direction. Optionally, the sensed current may be normalized with a voltage offset in order to avoid saturation and to provide symmetric excursions for positive and negative current values.

The normalized current may be output to a band pass filter 36. The band pass filter 36 may filter the current according to a desired frequency range associated with an expected speed range of the motor 12. The filtered current may then be distributed to a ripple detector 38. The ripple detector 38 may be configured for counting current peaks within the current circulating through the motor 12 in either of the primary and secondary directions, which may then be used by a controller 40 for determining the angular positioning of the motor 12.

The controller 40 may be configured to monitor and track ripples detected with the ripple detector 38 such that the controller 40 is able to track positioning of the vehicle seat, window, etc. as a function of the peaks counted over time. As described above, the ability to sense current in both the primary and secondary directions, i.e., before and after power is cut-off to the motor 12, allows the ripple detector 38 to count ripples associated with travel in the fore and aft directions, ripples occurring after power cut-off, and ripples associated with rebound activities.

The filtered current, in addition to being output to the ripple detector 38, may be output to a direction detector 42. The direction detector 42 may be configured to determine a direction of an element moved by the motor 12 as a function of the current relative to the voltage offset. For example, if the motor 12 is moving in the fore direction, the current may be expected to be a first voltage level relative to movement in the aft direction. The direction detector 42 may keep track of these current levels such that it is able to output directionality information that may be used by the processor 40 to coordinate directionality with the other processed parameters of the motor 12.

Prior to normalization, and in addition to the filter and other operations described above, the sensed current may be directly distributed to the processor 40 over a current input 44. The current input 44 may be used to sense the actual strength (voltage) of the current. This information may be helpful in assessing motor operation in that the signal strength tends to increase when more force is required to move the seat, window, etc.

Figure 2:
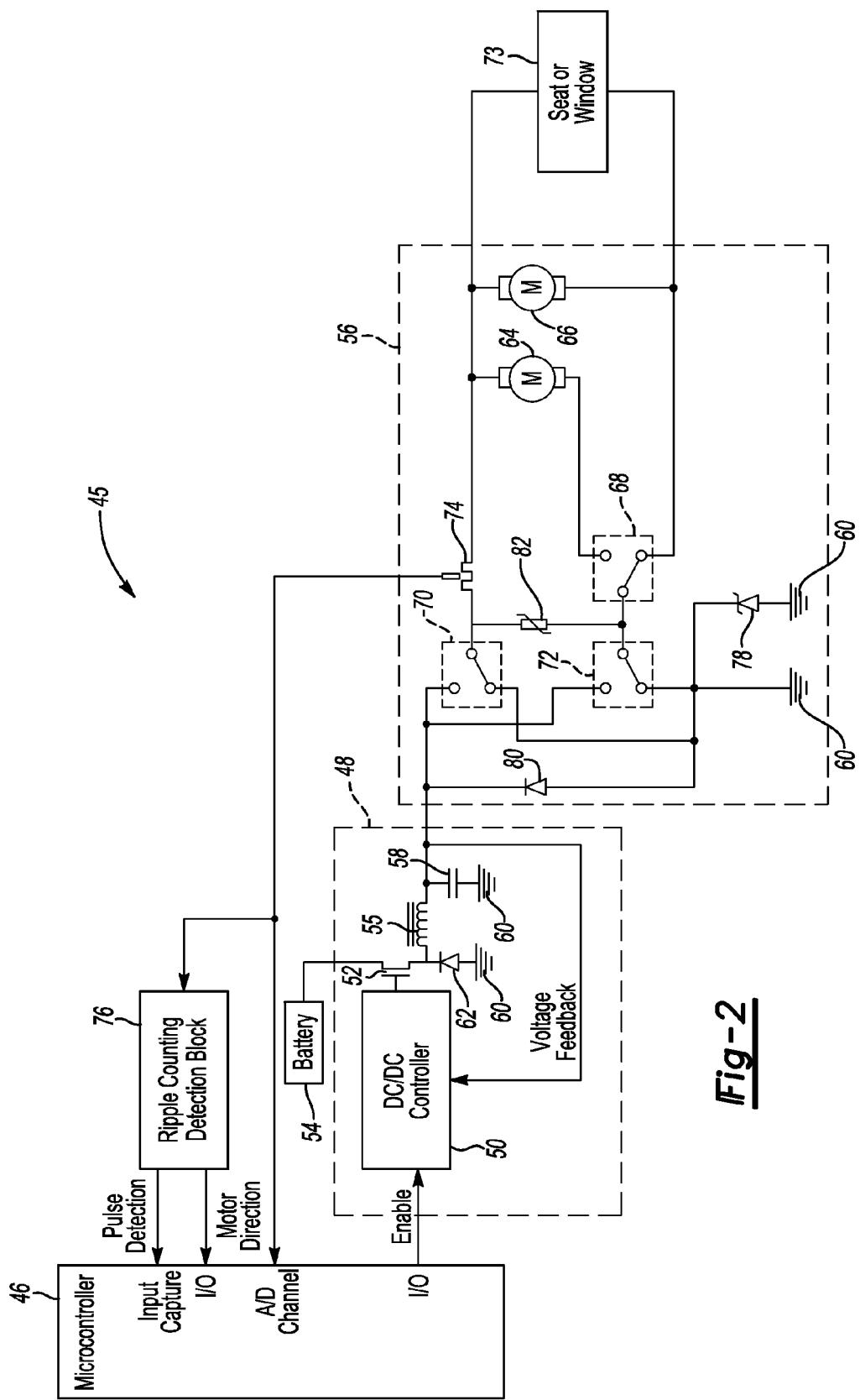
FIG. 2 is a block diagram of an embodiment of an electric motor speed regulating system.

Referring now to FIG. 2, an embodiment of a speed regulating system 45 may include a microcontroller 46 (or field programmable array, etc.) and a DC/DC buck converter 48. The microcontroller 46 may output a command signal to the converter 48 that enables a controller 50 to switch a field effect transistor (FET) 52. The particular frequency at which the FET 52 is switched may depend on design and/or environmental considerations. Of course, multiple converters 48 may be controlled by the microcontroller 46. In other embodiments, any suitable power converter topology may be used.

If the FET 52 is switched on, current from a battery 54 flows through the FET 52 and an inductor 55, and to a load 56 (provided the load 56 is electrically configured to receive current). A capacitor 58 charges as current flows to the load 56. If the FET 52 is switched off, current will continue to flow through the inductor 55 creating a voltage potential that will draw current from a ground 60 and through a diode 62. The voltage output by the converter 48 may be detected, in a known fashion, and fed back to the controller 50.

The load 56, in the embodiment of FIG. 2, includes motors 64, 66 selectable via relays 68, 70, 72. In other embodiments, the load 56 may take the form of that discussed with referenced to FIG. 1. Other configurations, arrangements and/or loads 56, of course, are also possible. For example, the load 56 may include more than two motors, etc. The motors 64, 66 of FIG. 2 may be electrically connected with, for example, an adjustable automotive seat (or automotive window) 73, etc.

The relay 68 selects which of the motors 64, 66 may be activated. As illustrated, the motor 66 may be activated. The relays 70, 72 determine the direction of current flow to the selected motor. As illustrated, the relays 70, 72 have grounded the motors 64, 66. If the relay 70 were toggled to its other position, current would flow in a clockwise direction through the motor 66. If the relay 72 were toggled to its other position, current would flow in a counterclockwise direction through the motor 66. The relays 68, 70, 72, in the embodiment of FIG. 2, are under the control of the microcontroller 46 in a known fashion.

In certain embodiments, a shunt 74 may be used to measure the current flow to/from the motors 64, 66. A ripple counting detection block 76, such as the monitoring portion 14 illustrated in FIG. 1 or other suitable ripple counting arrangement, etc., may be used to determine for example, the speed, movement, angular position and/or other parameters associated with operation of the motors 64, 66 based on the measured current. This information may be used by the microcontroller 46 to implement seat (window) memory functionality, etc., within an automotive vehicle. Alternatively, other current sensing technologies, such as a hall effect sensor, etc., may be used in concert with the microcontroller 46 to determine the seat (window) position.

As known in the art, diodes 78, 80, e.g., Transil, Free-Wheeling, etc., and a varistor 88 may be used to protect the circuitry and components of, for example, the load 56. Any such suitable devices, however, may be used.

The arrangement of FIG. 2 may be contrasted with other configurations that (i) lack the controller 50 and include a capacitor instead of the diode 62 or (ii) lack the controller 50 and FET 52 (such that the battery 54 is directly electrically connected with the inductor 55) and include a switching element (such as a MOSFET) between the ground 60 and relay 72, and a capacitor instead of the diode 62. Speed control in such configurations may be achieved via pulse width modulation (PWM) control of the FET 52 in (i) or MOSFET in (ii) via the microcontroller 46 at frequencies up to 20 kHz. This PWM control attempts to regulate the effective voltage presented to the load 56. Pulse-like voltage spikes, however, may occur at the beginning/end of the time period when the voltage is presented as the microcontroller 46 begins/ends its PWM control of the FET 52 in (i) or MOSFET in (ii). This PWM control may also alter the current waveform sensed by the shunt 74 and thus adversely affect ripple counting (as well as introduce electromagnetic noise into the system).

Figure 3:
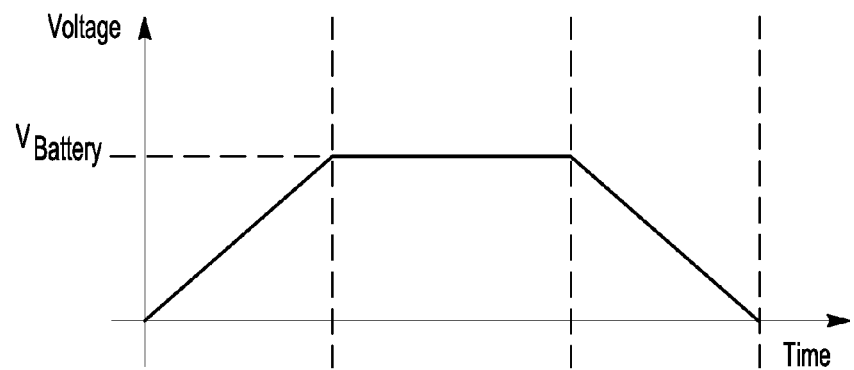
FIG. 3 is an example plot of voltage presented to the load of FIG. 2 versus time.

Referring now to FIGS. 2 and 3, the converter 48 may present, under the command of the microcontroller 46, a controllable/regulatable/selectable voltage to the load 56 that, inter alia, permits a soft start/soft stop of the motors 64, 66. That is, a voltage presented to the load 56 may ramp up to a desired value, continue at that desired value, and then ramp down to effectuate a soft start and soft stop of a selected motor. The profile of the voltage ramps, as illustrated in FIG. 3, are generally linear. In other embodiments, the voltage ramps may be convex, concave, etc. as dictated by the microcontroller 46. The length of the soft start/soft stop, e.g., duration of the ramping, may, for example, be adjusted via RC circuitry in the controller 50 or by a command signal generated by the microcontroller 46 as apparent to those of ordinary skill.

In some embodiments, the converter 48 may present a voltage to the load 56 approximately equal to a voltage of the battery 54 at the end of a soft start such that a selected motor is moving at a maximum speed after the soft start. In other embodiments, the converter 48 may present different voltages, relative to the voltage of the battery 54, to the load 56 based on the control of the controller 50 by the microcontroller 46.

Figure 4:
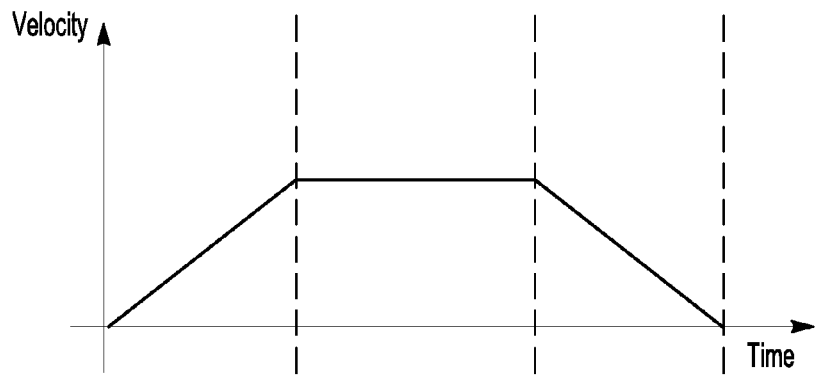
FIG. 4 is an example plot of velocity of the seat of FIG. 2 versus time.
Figure 5:
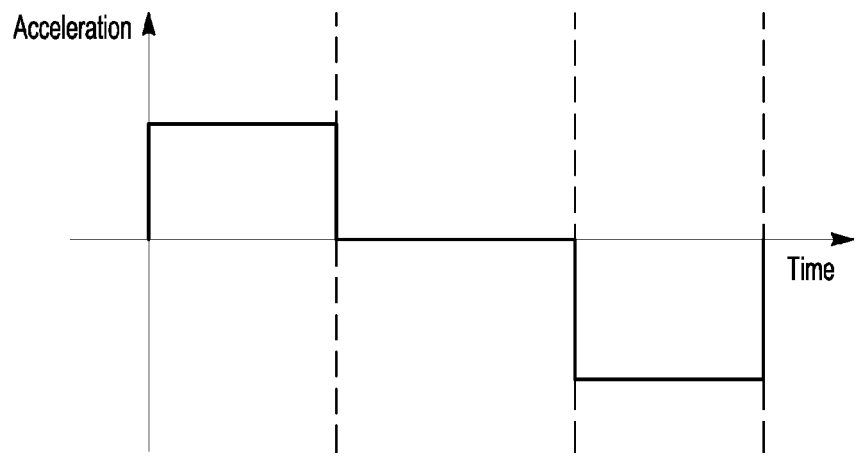
FIG. 5 is an example plot of acceleration of the seat of FIG. 2 versus time.

Referring now to FIGS. 2, 3, 4 and 5, the velocity at which the seat (or window) 73 moves is proportional to the voltage presented to the load 56. As illustrated in FIG. 3, the voltage ramps are generally linear. Thus, the associated rate of speed increase and speed decrease is generally linear as illustrated in FIG. 4. This results in generally constant acceleration while the seat (or window) 73 is ramping up to its desired speed or ramping down from its desired speed as illustrated in FIG. 5 (which may be desired by, for example, an occupant of the seat 73). As discussed above, the profile of the voltage ramps may take any suitable shape as dictated by the microcontroller 46. Differing voltage ramp profiles, however, may result in differing speed and acceleration plots as compared to those illustrated in FIGS. 4 and 5.

Referring again to FIG. 2, the FET 52 may achieve relatively high switching frequencies, e.g., 100-300 kHz. These higher frequencies may improve the ripple detection by detection block 76. As apparent to those of ordinary skill, the effects of the switching of the FET 52 on the current measured by the shunt 74 may, for example, be filtered out using a low pass filter; electromagnetic noise associated with the switching of the FET 52 may be filtered out by the LC filter formed by the inductor 55 and capacitor 58.

In one example, as an automotive seat control switch is pushed, the relay 68 is configured to select which of the motors 64, 66 to activate. The relays 70, 72 are configured to select the direction of current flow through the selected motor. The converter 48 raises, at a controlled rate, a voltage presented to the load 56 up to a desired level (as directed by the microcontroller 46) and the selected motor begins to move. To determine an initial position of a the seat 73 to be moved by the selected motor, the detection block 76 determines the number of motor turns associated with pulses produced by brushes of the selected motor. This information may later be used to facilitate memory functions associated with a position of the seat 73. Once the seat 73 reaches a desired position, the converter 48 lowers, at a controlled rate, the voltage presented to the load 56, and the relays 70, 72 are grounded.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. An automotive seat system comprising:
   a moveable vehicle seat;
   at least one electric motor adapted to cause the seat to move;
   a controller; and
   a DC/DC power converter responsive to the controller and including a first switch, inductor and capacitor arranged to output a voltage ramp to the at least one motor to control the acceleration or deceleration of the seat.

2. The system of claim 1 wherein the voltage ramp generally increases from a first value to a second value.

3. The system of claim 2 wherein the second value is approximately equal to a voltage of a power storage unit electrically connected with the converter.

4. The system of claim 1 wherein the voltage ramp generally decreases from a first value to a second value.

5. The system of claim 4 wherein the first value is approximately equal to a voltage of a power storage unit electrically connected with the converter.

6. The system of claim 1 wherein the first switch is a field effect transistor.

7. The system of claim 6 wherein the field effect transistor is electrically connected with a power storage unit.

8. The system of claim 1 further comprising a second switch electrically connected with the at least one motor and the converter and configured to select, under the command of the controller, the direction of rotation of the at least one motor.

9. An automotive seat system comprising:
   a moveable vehicle seat;
   at least one electric motor adapted to cause the seat to move;
   a DC/DC power converter including a first switch, inductor and capacitor and configured to output a voltage to the at least one electric motor that increases to a desired value and subsequently decreases to control the movement of the seat; and
   a controller configured to control the rate of voltage increase and voltage decrease output by the converter.

10. The system of claim 9 wherein the desired value is approximately equal to a voltage of a power storage unit electrically connected with the converter.

11. The system of claim 9 wherein the first switch is a field effect transistor.

12. The system of claim 11 wherein the field effect transistor is electrically connected with a power storage unit.

13. The system of claim 9 further comprising a second switch, wherein the converter is selectively electrically connected with the at least one motor via the second switch.

14. The system of claim 13 wherein the second switch is configured to select, under the command of the controller, the direction of rotation of the at least one motor.

15. An automotive electric motor speed control system comprising:
- at least one electric motor adapted to cause a moveable element to move;
- a DC/DC power converter including a first switch, inductor and capacitor and configured to output a voltage to the at least one electric motor that increases to a desired value and subsequently decreases to control the movement of the moveable element; and
- a controller configured to control the rate of voltage increase and voltage decrease output by the converter.

16. The system of claim 15 wherein the desired value is approximately equal to a voltage of a power storage unit electrically connected with the converter.

17. The system of claim 15 further comprising a second switch, wherein the converter is selectively electrically connected with the at least one motor via the second switch.

18. The system of claim 17 wherein the second switch is configured to select, under the command of the controller, the direction of rotation of the at least one motor.

* * * * *